United States Patent [19]

Kato et al.

[11] Patent Number: 5,000,047

[45] Date of Patent: Mar. 19, 1991

[54] PRESSURE SENSOR

[75] Inventors: Yukihiro Kato, Kariya; Masahiro Asai, Hekinan; Yosihumi Watanabe, Anjo; Tomohiro Watanabe, Ichinomiya, all of Japan

[73] Assignee: Nippondenso Co., Ltd., Kariya, Japan

[21] Appl. No.: 316,647

[22] Filed: Feb. 28, 1989

[30] Foreign Application Priority Data

Mar. 29, 1988 [JP] Japan .................................. 63-75552
Nov. 22, 1988 [JP] Japan ................................ 63-295269

[51] Int. Cl.$^5$ ............................ G01L 7/08; G01L 9/04
[52] U.S. Cl. ........................................ 73/706; 73/726; 73/753; 338/4
[58] Field of Search ................... 73/706, 720, 721, 726, 73/727, 753, 754, DIG. 4, 115, 730, 756; 338/4, 42

[56] References Cited

U.S. PATENT DOCUMENTS 4,563,903  1/1986  Köhnlechner ........................ 73/706
4,644,797  2/1987  Ichikawa et al. ..................... 73/708
4,697,643  10/1987  Sassier .................................. 73/706

FOREIGN PATENT DOCUMENTS 58-5232   1/1983  Japan .
60-49441  4/1985  Japan .
61-11625  1/1986  Japan .
61-22222  1/1986  Japan .

OTHER PUBLICATIONS

Operating Instructions Piezoresistive Absolute Pressure Transducers (Issued by Kistler) (Issue date thereof is unknown).

Primary Examiner—Donald O. Woodiel
Attorney, Agent, or Firm—Cushman, Darby & Cushman

[57] ABSTRACT

This pressure sensor comprises a housing having a cavity at at least one end portion thereof, a pressure detecting element provided with the cavity and generating an electric signal corresponding to the pressure detected, a transmitter for transmitting the signal to the outside of the housing, and hermetically sealed with one end thereof connected to the pressure detecting element, a sealed medium provided within the cavity to prevent deterioration of the pressure detecting element, a diaphragm provided to cover the surface of the cavity, and a sealing element for sealing the sealed medium within the cavity and provided in a portion connected to the cavity of the housing, and further, a sealing ability of either the hermetic seal portion of the transmitter or of the sealing element is improved by utilizing a back pressure of a pressure medium. The sealing ability is improved by either making both surfaces of a diaphragm and of a sealing element form a common surface of the housing, by forming a grooved portion surrounding the hermetic terminal, or by attenuating the diameter of the top end portion of the housing. Leakage of the sealing liquid from the hermetic terminal or the sealing element is thus effectively prevented, and the reliability of the mechanical strength of the connecting portion of the housing and the device on which the housing is installed is improved, and thus a high reliability semiconductor pressure sensor to be used for detecting the pressure of a high pressure medium can be obtained.

24 Claims, 7 Drawing Sheets

PRESSURE SENSOR

BACKGROUND OF THE INVENTION

1. Field of the Invention

This invention relates to a pressure sensor, particularly to such a sensor used under a high pressure condition of, for example, more than 500 kgf/cm$^2$, and utilizing a semiconductor, for example, a piezoresistance element, as a pressure detecting element. The pressure sensor of this invention can be used, for example, in an oil pressure regulating system for construction equipment and the like.

2. Description of the Related Art

There are many different kinds of known pressure sensors generating an electrical signal corresponding to a pressure detected, each using a different method of detecting a pressure, but a pressure sensor having a semiconductor pressure detecting element in which a piezoresistance element is provided on a silicon substrate is now most widely used.

A pressure sensor provided with such a semiconductor pressure detecting element is known as a liquid-seal type pressure sensor, and is used under a condition such that the pressure detecting element is sealed with a suitable liquid such as a silicon oil 104 or the like, to eliminate a problem of deterioration of the element.

An example of the construction of such a semiconductor pressure detecting element is illustrated in FIG. 7.

In FIG. 7, a pressure detecting element 103, consisting of a piezoresistance element formed on a surface of a silicon substrate, is firmly mounted on the surface of a mount 102 made of an insulating material such as a borosilicate glass.

The mount 102 is hermetically fixed to a housing 100 of the sensor in such a way that the pressure detecting element 103 is inserted in a cavity 101 formed inside the housing 100 and serving as a sensor room S, and a lead wire 107 is provided in the mount 102 in such a manner that it penetrates therethrough and is hermetically sealed to the mount 102 with an insulating sealing material 108 such as a glass or the like, and one end thereof projects into the cavity 101 and serves as a hermetic terminal to enable contact between the lead wire 107 and the detecting element 103 through a suitable wire f, to thereby transmit an electric signal output by the pressure detecting element 103, to the outside. Further, a connecting aperture R for communicating one surface of the detecting element 103 with the atmosphere is provided in the mount 102, and a circumferential portion of a sealing diaphragm 105 covering the detecting element 103 and separating the cavity 101 into a sensor room S, is fixed to the housing 100 by welding or the like.

A passage 120 for communicating the inside portion of the sensor room S with the outside is provided in the housing 100, and a sealing liquid such as a silicon oil or the like is injected therethrough and into the sensor room S, after the detecting element 103 and the sealing diaphragm 105 are mounted on the housing 100, and a vacuum is established therein, and then a sealing element such as plug 121 or the like is inserted into the passage 120.

Finally, a flange portion 113 having an aperture 115 through which the pressure medium enters the cavity to come into contact with the diaphragm is fixed to the housing 100 by a bolt 114 and a hermetic packing such as an O-ring or the like therebetween, to complete the assembly of the pressure sensor.

In the thus-assembled pressure sensor, a pressure medium, such as oil, water, air, and other liquids, is introduced into a pressure medium introducing portion 116 provided in the pressure sensor through the aperture 115 provided in the flange portion 113, whereby the pressure detecting element 103 detects the pressure of the pressure medium, through the sealing diaphragm 105 and the silicon oil sealed inside the sensor room S, and generates an electric signal corresponding to the pressure detected, at the output of the detecting element 103 and this signal is transmitted to the outside through the lead wire 107.

The components of the liquid-seal type pressure sensor are not deteriorated by contact with the pressure medium such as a liquid or the like, and the sensor has superior characteristics in that it is environment proof and has a high level of reliability, due to the sealing of the detecting surface of the pressure detecting element 103 by a stable liquid such as a silicon oil or the like.

Nevertheless, in this kind of pressure sensor, the pressure of the pressure medium to be measured is directly applied to the liquid contained inside the sensor room S, and this pressure may reach a very high level of 2000 atms when the sensor is used in oil pressure equipment.

In this case, when the pressure sensor shown in FIG. 7 is used, the pressure of the pressure medium is also directly applied to the plug 121 through the silicon oil, and since one end surface of the plug 121 is exposed to the atmosphere, and the other end surface thereof is under pressure from the silicon oil 104, a problem may arise in that, if the plug 121 is not firmly fixed in the housing 100, a leakage of the liquid will occur at the plug 121 and thus the reliability of the pressure sensor device will be lowered.

FIG. 8 shows a different type of pressure sensor from that shown in FIG. 7. In the pressure sensor shown in FIG. 8, a housing 100 having a cavity 101 formed at one end thereof in which a mount 102 and a semiconductor pressure detecting element 103 are inserted, is provided. The cavity 101 is filled with a sealing liquid 104 such as a silicon oil or the like, and further, the sealing liquid is hermetically sealed by a sealing diaphragm 105 in the same manner as in the previous sensor. Also, to transmit an electrical signal output through a lead wire f, by the detecting element 103 to the outside, a lead wire 107 is provided in the housing 100 in such a manner that the wire 107 penetrates through the housing 100 and is hermetically sealed to the housing 100 with an insulating sealing material 108 such as a glass or the like; one end thereof projecting into the cavity to form a hermetic terminal in contact with the lead wire f, and the other end thereof projecting into a non-pressurized portion of the housing 100 and in contact with a circuit substrate 109.

Thereafter, the thus-assembled pressure sensor is mounted on a suitable aperture provided in a portion of a device containing a pressure medium therein, by a screw thread 111 having a sealing ring 112 therebetween.

In this case, a high pressure medium applied to the sensor from the direction indicated by an arrow A in FIG. 8, can be sealed at the O-ring 112 made of rubber.

The thus-mounted pressure sensor operates in the same way as the previously described sensor, and has the same effect.

In this kind of pressure sensor, however, the value of the pressure which is applied to the entire pressure sensor by the pressure medium is determined by the diameter of the O-ring 112, i.e., the larger the diameter thereof, the greater the pressure received by the entire pressure sensor.

As shown in FIG. 8, since the pressure sensor of the prior art has a construction such that a screw thread is provided closer to the pressure medium, compared with the position at which the O-ring 112 is located, the diameter of the O-ring 112 must be larger than that of the screw portion.

Therefore, another problem arises in that the reliability of the mechanical strength of the screw thread portion 111 is lowered because the diameter of the O-ring 112 must be restricted, and therefore, when used as a pressure sensor for detecting a high pressure of more than 500 kgf/cm$^2$, the value of the pressure applied to entire pressure sensor will become very large. Countermeasures intended to solve this problem have not been taken, and the use of a semiconductor pressure sensor for detecting a high pressure of more than 500 kgf/cm$^2$ and having a high reliability has not been attempted.

Further, in this kind of pressure sensor, another problem arises in that a leakage of the sealing liquid will frequently occur at the hermetically sealed portion 108.

Namely, as shown in FIG. 9, when a high pressure is applied to the surface of the bottom portion of the cavity of the housing 100, especially the portion close to the hermetic terminal, the portion of the housing surrounding the insulating sealing material 108 is expanded outward thereby and the silicon oil leaks out through the contacting surfaces of the housing and the sealing material, or between the sealing material and the lead wire as indicated by an arrow B in FIG. 9, and thus the characteristic of the sensor is deteriorated.

Recent demands for a measurement of a higher pressure oil (or fuel) or the like in the vehicle have led to a need for the use of a semiconductor pressure sensor for such high pressure measurements.

SUMMARY OF THE INVENTION

This invention is intended to overcome the above-mentioned drawbacks, and the object of the invention is to provide a semiconductor pressure sensor from which a leakage of liquid sealed therein will not occur, by reducing the load applied to the sealing element used for sealing the sealing liquid inside the sensor.

Another object of the invention is to provide a semiconductor pressure sensor having a novel construction and a novel method of installing the sensor unit on the device containing the pressure medium therein to thereby provide a reliable semiconductor pressure sensor, which can be used to measure a high pressure medium, the pressure having a highly reliable screw thread portion from which a leakage of the sealing liquid such as a silicon oil or the like will not occur.

Therefore, the pressure sensor according to the present invention comprises: a housing having a cavity at at least one end portion thereof a pressure detecting element provided within the cavity which generates an electric signal corresponding to a pressure detected; a transmitting means for transmitting the signal to outside of the housing hermetically sealed in the housing, one end thereof being connected to a portion of said cavity of the pressure detecting element; a sealed medium provided within the cavity to prevent a deterioration of the pressure detecting element; a diaphragm provided to cover the cavity; a sealing element for sealing the sealed medium within the cavity and provided in a portion connected to the cavity of the housing.

The pressure sensor further comprises a means by which a sealing ability of the portion having a possibility of leakage of the sealed medium connected to the cavity is improved by utilizing a back pressure of a high pressure medium.

Namely, in this invention, a characteristic feature of the pressure sensor is the means for improving the sealing ability of several portions of the pressure sensor to provide a pressure sensor which can be used to measure a high pressure medium and has a high reliability with regard to a non-leakage of a sealing liquid contained in the pressure sensor in particular.

DESCRIPTION OF THE PREFERRED EMBODIMENTS

Figure 1:
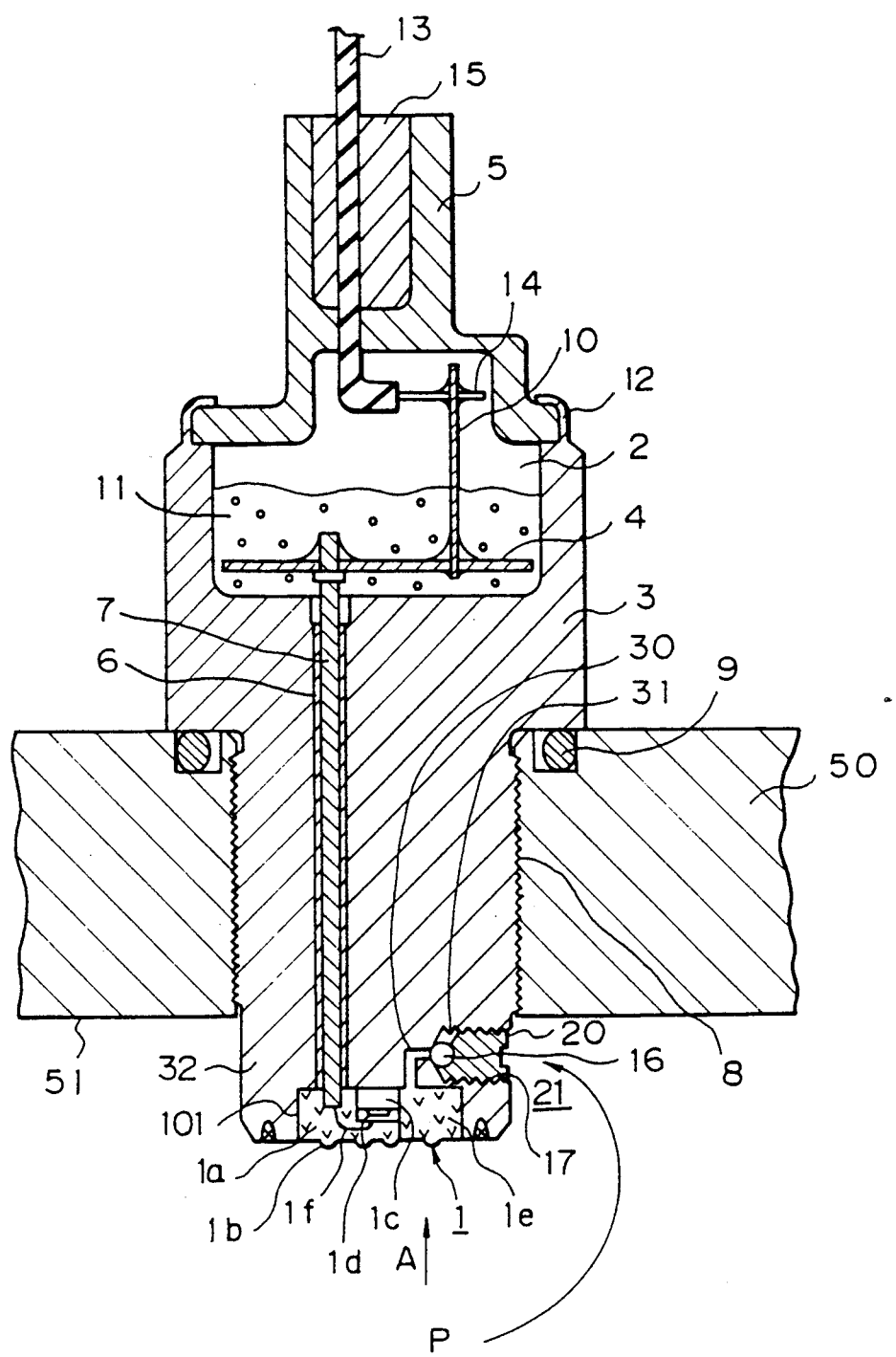
FIG. 1 is a cross sectional view of one embodiment of the pressure sensor of the present invention.

The preferred embodiments of this invention will be explained with reference to the accompanying drawings.

One embodiment of the above means for improving the sealing ability of a pressure sensors is realized by a construction such that at least one end surface of the sealing element forms a part of the surface of the housing in the vicinity of the surface portion of the diaphragm, so that the surfaces of the sealing element and the diaphragm form a part of the continuous common surface of the housing. More precisely, when the housing of the pressure sensor having the above means is mounted on a device containing a high pressure medium therein, preferably both of the surfaces are in contact with the same high pressure medium.

Note that, in such a construction, the sealing element is positioned between the sealed medium and the high pressure medium, so that the sealed medium can be held inside the cavity without any leakage due to the back pressure of the high pressure medium.

The term "the continuous common surface of the housing" denotes a surface not divided into separate parts, and can include any continuous surface of the housing, even curved or angled.

Accordingly, in this invention, the case in which the surfaces of the sealing element and the diaphragm are formed on a common plane surface of the housing of the pressure sensor, and another case in which each surface of the sealing element and the diaphragm is formed on a respective plane, and each are in contact with each other to form a continuous surface arranged at a right angle therebetween, are included in this invention.

Accordingly, in one embodiment of this invention, the end portion of the housing having the surfaces of the sealing element and the diaphragm on the surface thereof is preferably projected from the inner surface of the device into the high pressure medium when the housing is mounted on the device by, for example, a screw thread, or can be mounted on the device in such a way that the end portion thereof does not project from the inner surface of the device into the high pressure medium. In the latter case, the housing in which the surface of the sealing element is on the peripheral surface of the end portion thereof and the surface of the diaphragm is on the top end portion thereof can be used, and preferably, at least the surface of the sealing element provided on the peripheral surface of the end portion thereof faces the inner surface of the aperture in which the housing is inserted when mounted, with a predetermined gap therebetween.

Leakage of the sealing liquid is effectively prevented in the semiconductor pressure sensor of this invention, since the sealing element is provided between the sealed medium and the high pressure medium, whereby the sealing element is subjected to the same pressure on the side facing the sealed medium and on the other side facing the pressure medium, and thus the load applied to the sealing element is reduced.

Another embodiment of the means for improving the sealing ability of the pressure sensor has a construction such that a diameter of the end portion of the housing at which the cavity is provided is smaller than that of the rest of the housing.

In more detail, the housing is provided with a first body having a screw thread formed on the surface thereof, to fit the housing to the device, and a second body having a diameter smaller than that of the first body and projected longitudinally of the first body with a shoulder portion therebetween connecting the first and the second bodies, and a cavity containing the detecting element and sealing liquid therein provided in the second body, and further, the transmitting means such as a lead wire or the like penetrates the second body to form a hermetic terminal in the cavity.

In this embodiment, the sealing ring may be installed between the shoulder portion of the housing and the step-like portion of the aperture of the device through which a part of the housing is inserted when mounted thereon.

Further, the housing may be installed on a device containing the high pressure medium therein by inserting at least one end thereof into an aperture provided in the device by fitting a screw thread provided on the outer surface of the housing into a screw thread provided on an inner surface of the aperture of the device, and further, the aperture is provided with an attenuated portion having a diameter smaller than that of the portion on which the screw thread is formed, to make a step-like portion therebetween, and preferably a sealing ring is provided in the vicinity of the step-like portion to reduce the pressure applied to the screw portion, so that leakage of the pressure medium contained in the device is effectively prevented.

A ring made of a metal or an elastic material such as a rubber or the like and having a cross sectional configuration such as a circle or a C-shape or the like can be used as a sealing ring of this invention. Note, when a sealing ring having a circular cross section is used, preferably several apertures V are provided in the surface of the sealing ring as shown in FIG. 5b.

In this embodiment, since the diameter of the sealing ring is smaller than that of the screw portion, the pressure applied to the device as a whole, especially to the screw portion, is effectively reduced, and therefore, the reliability of the pressure sensor is increased.

In a modification of the embodiment mentioned above, the housing having the first and second body as mentioned above may be mounted on a device containing the high pressure medium therein in the same manner as explained above, but here the aperture provided in the device is provided with an attenuated portion having a diameter smaller than that of the portion on which the screw thread is formed; this attenuated portion being formed at a position corresponding to the second body of the housing, i.e., the end portion of the housing having a relatively smaller diameter, and located closer to the high pressure medium than to the screw thread portion, to form a step-like portion therebetween. Moreover, in a further embodiment of this invention, the means for improving the sealing of the pressure sensor may be realized by a construction such that a grooved portion surrounding the hermetically sealed portion of transmitting means is provided in the vicinity of the bottom portion of the cavity, so that the grooved portion is connected to the cavity and is filled with the sealed medium. In this embodiment, the hermetic sealing of the transmitting means is improved by applying the pressure of the sealing liquid such as a silicon oil or the like to the end portion of the hermetic terminal, to strengthen the sealing effect thereof.

In another embodiment, at least one end surface of the sealing element forms a part of the surface of the housing in the vicinity of the surface portion of the diaphragm, so that the surfaces of both the sealing element and the diaphragm form a part of the continuous common surface of the housing. More precisely, when the housing of the pressure sensor having a means explained above is mounted on the device containing a high pressure medium, preferably both of the surfaces are provided in the same high pressure medium, and in another embodiment, the surface of the sealing element is provided in such a way that it faces the inner surface of an aperture of the device containing the high pressure medium, through which the housing of the pressure sensor is inserted with a predetermined gap therebetween for filling the high pressure medium therein.

According to the above embodiment, the pressure applied to the entire pressure sensor can be reduced because the portion sealing the high pressure medium is formed by using a sealing ring between the step-like portion, having a diameter smaller than that of the screw thread and the pressure sensor.

The sealing ability i.e., sealing characteristic, of the sealing portion of the hermetic terminal of the transmitting means such as a lead wire or the like penetrating the housing is improved because the terminal portion receives the pressure from the high pressure medium filled between the device and the second portion of the housing, and thus a portion of the housing in the vicinity of the terminal is compressed in the direction of the terminal.

Moreover, when a groove portion is provided in the vicinity of the terminal, the sealing ability of the hermetic terminal also can be improved because the portion of the housing between the grooved portion and the terminal will act to compress the terminal due to the pressure generated by the sealed medium contained in the groove when the sealed medium in the cavity is under pressure from the high pressure medium.

The first embodiment of the pressure sensor of this invention, which is suitable for detecting a pressure medium having a high pressure of 50-200 atm, is shown in FIG. 1.

In FIG. 1, a housing 3 having a cavity at one end thereof containing a pressure sensitive portion 1 therein, and having a container-like open-ended inner space portion 2 with a circular cross section, is provided, a substrate 4 is provided in the inner space portion 2, and the top of the inner space portion 2 is covered with a covering material 5 fixed to the housing by caulking or the like.

The pressure sensitive portion 1 comprises a pressure chamber 1a, a metallic diaphragm 1b covering an open portion of the cavity 1a being connected to the peripheral portion of the chamber by welding, a mount 1c fixed inside the chamber 1a, and a semiconductor pressure detecting element 1d having a semiconductor strain gauge formed by a diffusion method on one surface thereof, and having a concave portion for forming a diaphragm on the other surface thereof.

Further, the pressure chamber 1a is filled with a silicon oil 1e to prevent deterioration of the semiconductor pressure detecting element 1d.

On the other hand, a lead wire 7, which is an electric transmitting means, is provided in the housing 3 with an insulating seal 6 made of glass, and one end thereof is connected to the output of the semiconductor pressure detecting element 1d through a wire 1f connected therebetween by wire bonding. The another end of the lead wire 7 is projected into the inner space portion 2 and connected to the substrate 4 by welding.

The housing 3 is provided with a screw thread portion 8 on the surface thereof, and thus can be easily joined to the other component 50, i.e., the device containing the pressure medium, for example, various high pressure equipment, oil pressure equipment or the like, by a thread fastening.

An O-ring 9 having a circular cross section is provided for sealing the housing 3 and the other component 50.

The substrate 4 to which the lead wire 10 is connected by welding, is covered with a silicon gel 11 on the peripheral surface thereof to prevent contamination of the substrate 4 by moisture, dust or the like.

The cover portion 5 is fixedly mounted on the housing 3 in such a way that a part of the cover portion 5 is inserted into the inner space portion 2 of the housing 3 and the edge portion 12 of the housing 3 is connected to the outer edge portion of the cover portion 5, and fixedly adhered together by caulking.

A lead wire 14 covered with a film 13 made of, for example, resin, is fixedly provided on the cover portion 5 by a potting method utilizing an epoxy resin or the like 15, for example, and one end thereof inside the inner space portion 2 is connected to the lead wire 10 by welding.

Another cavity 31, separate from the cavity for the pressure chamber 1a, is provided in the vicinity of the pressure chamber 1 and connected to the cavity 1a through a passage 30.

In this construction, the sealing element 21 comprising a steel ball valve 16 having a spherical shape and a plug 20 for sealing silicon oil, is provided inside the cavity 31, and the steel ball valve 16 is used to directly seal the silicon oil, by being fixedly attached to the entrance of the passage 30 by the plug 20 secured in the cavity 31 with a screw 17.

As seen in FIG. 1, the end surface of the plug 20 opposite to the side on which the steel ball valve 16 is mounted, forms a surface of a portion 32 of one end portion of the housing 3 which is perpendicular to the end surface 33 of the housing 3 on which the cavity 1a having a diaphragm 1b is provided, but both surfaces are formed in a continuous configuration and can come into contact with the high pressure medium.

Accordingly, when the pressure sensor mentioned above is installed on the device 50, the end portion of the housing is preferably projected from the inner surface 51 of the device 50, to enable the surfaces of the sealing element 21 and the diaphragm 1b to be subjected to the same pressure applied by the high pressure medium.

Therefore, in the pressure sensor described above, no pressure difference exists between the surface of the sealing element comprising the steel ball valve 16 and the plug 20, for example, and facing the silicon oil, or on the other surface thereof facing the high pressure medium, because the pressure P received by the sealing element from the high pressure medium, as shown by arrow B, is the same as the pressure P received by the sealing element from the silicon oil as shown by arrow A.

Therefore, even when a high pressure such as several hundreds of atms. is applied to the diaphragm 1b, the steel ball valve 16 and the plug 20 is subjected to the same pressure of several hundreds atms. applied thereto by the high pressure medium in the direction shown by arrow B, and therefore, the silicon oil does not leak to the outside, and thus the reliability of the sensor is increased.

Figure 2:
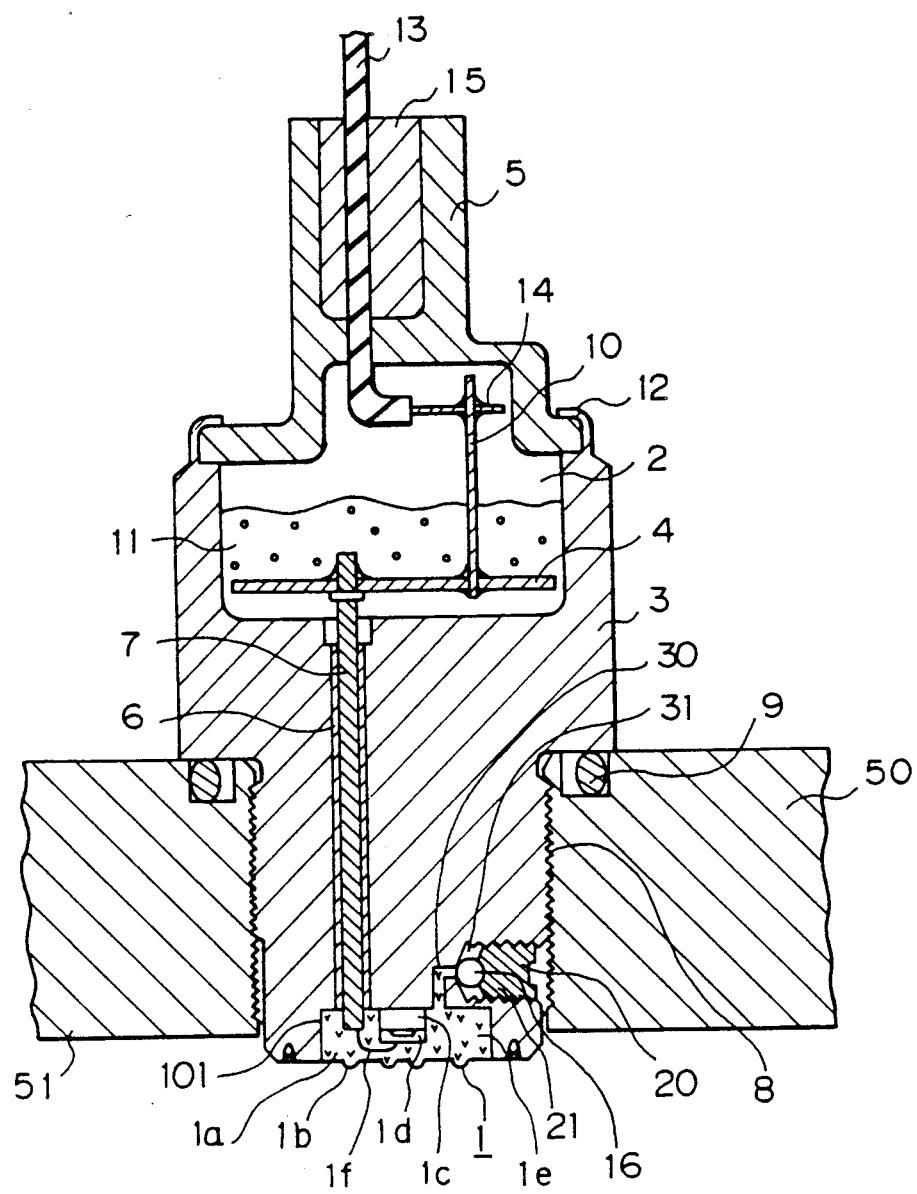
FIG. 2 is a cross sectional view of a second embodiment of the pressure sensor of the present invention.

The second embodiment of the pressure sensor of this invention will be explained with reference to FIG. 2. Note, in this embodiment, the same components as used in the first embodiment are denoted by the same reference numbers.

This embodiment has the same construction as of the pressure sensor of the first embodiment, except for the configuration of the housing 3 and the positions at which the sealing element 21 comprising the steel ball valve 16 and the plug 20 are provided with respect to the inner surface of the aperture of the device 50. Namely, the sealing element 21 comprising the steel ball valve 16 and the plug 20 is arranged in the aperture and the surface of the plug 20 faces the inner surface of the aperture; particularly it faces the screw thread portion 8 provided on the inner surface of the aperture of the device 50, i.e., the sealing element is placed between the silicon oil 1e and the pressure medium filled in the gap formed between the outer surface of the housing 3 and the inner surface of the aperture of the device 50 and sealed by the O-ring 9.

According to this second embodiment of the semiconductor pressure sensor, as in the first embodiment, there is no pressure difference between the surface of the sealing element 21 comprising the steel ball valve 16 and the plug 20, for example, facing the silicon oil, and the other surface thereof facing the high pressure medium. Therefore, even when a high pressure such as several hundreds of atms is applied to the diaphragm 1b, the pressure applied to one side of the sealing element 21 comprising the steel ball valve 16 and the plug 20 through the silicon oil and the pressure applied to the other side of the sealing element 21 directly from the high pressure medium are equal, and thus no pressure difference exists between both sides of the sealing element 21, and therefore, the silicon oil does not leak to the outside and the reliability of the sensor is increased.

Moreover, since the position at which the sealing element 21 is located is arranged so as to face an inner surface of the aperture of the device, the overall size of the sensor can be reduced to an extent of a length of the end portion of the housing as shown in FIG. 1. As a result, a top end of the housing portion is not projected from an inner surface of a device 50 in which a pressurized medium is contained.

In both the first and second embodiment, the steel ball valve 16 is compressively fixed to the entrance of the passage 30 by the plug 20 with a screw thread 17, but a screw having a conical top end or "EXPANDER" (A product name of the one presented by KOENIG CO.) (product name) can be used for the sealing element instead of the steel ball valve 16 and the plug 20.

Further, the position at which the steel ball valve 16 and the plug 20 are arranged is not restricted only to the position mentioned above but may be any position between the high pressure medium and the silicon oil.

A third embodiment of the present invention will be explained with reference to FIGS. 3 and 4.

Figure 3:
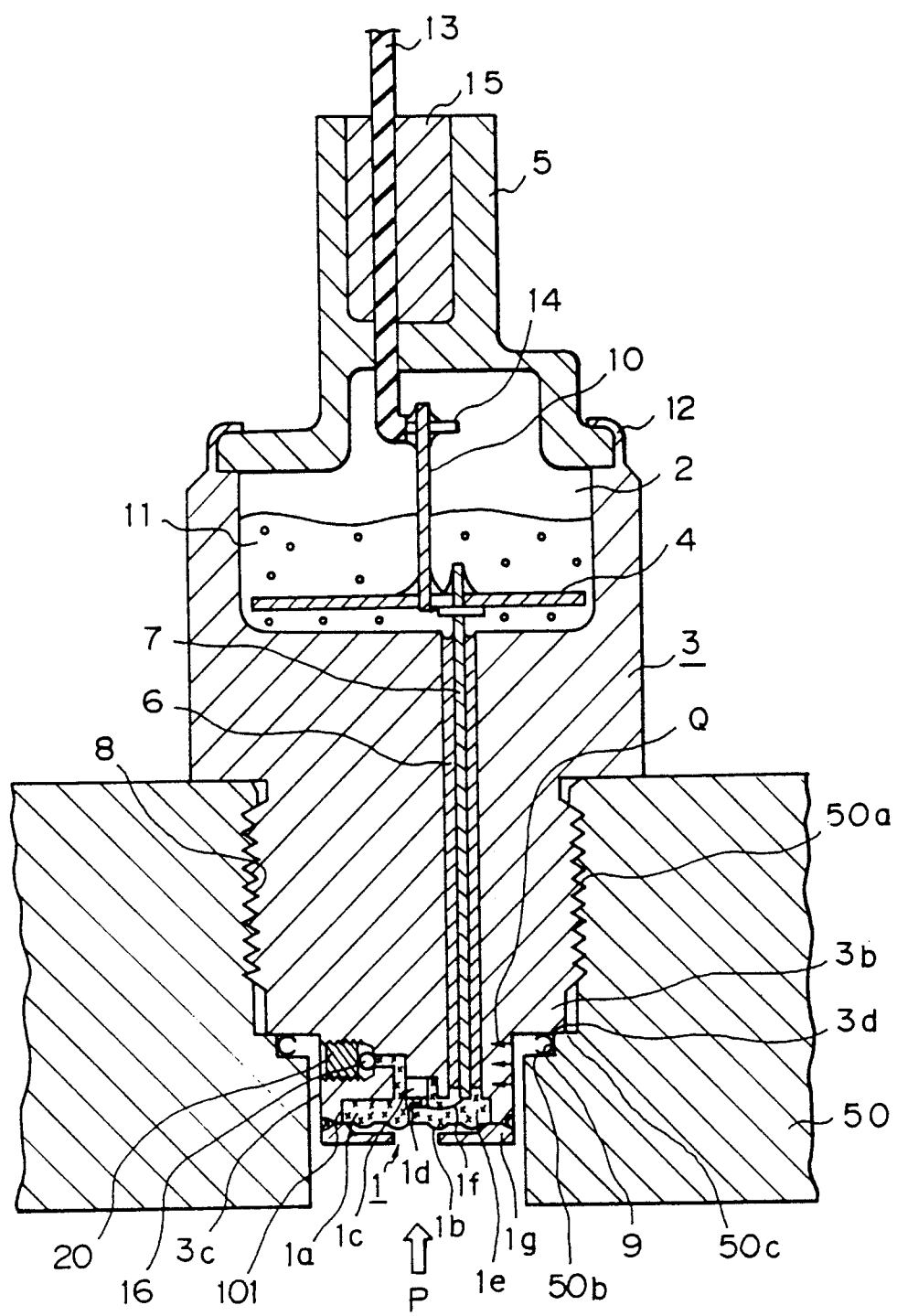
FIG. 3 is a cross sectional view of a third embodiment of the pressure sensor of the present invention.
Figure 4:
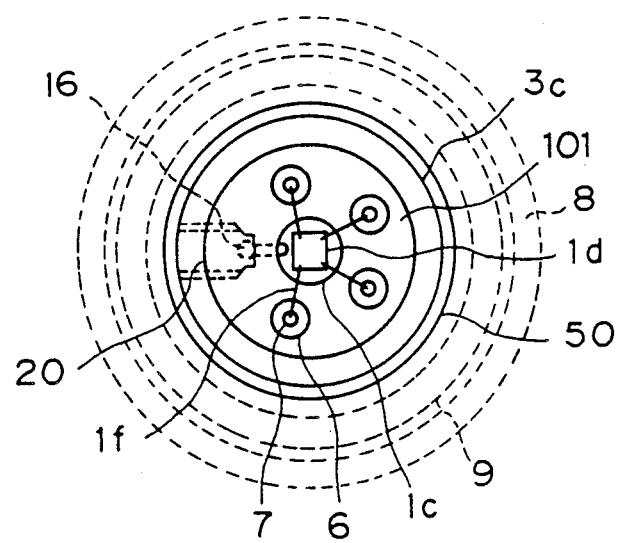
FIG. 4 is a plane view of the pressure sensor shown in FIG. 3.

FIG. 3 is a cross sectional view of the pressure sensor of this embodiment in which a pressure sensing housing 3 is installed on a device 50 containing a pressure medium therein, and FIG. 4 is a plane view of the end portion of the housing 3 shown in FIG. 3, with the metallic diaphragm 1b and circular plate 1g having aperture removed therefrom.

In FIG. 3, the configuration of the housing 3 is the same as that of the housing 3 of the first embodiment, except that a circular plate 1g having apertures thereon is provided on the top end surface of the housing 3 welded to the metallic diaphragm 1b around the whole circumference thereof, and the end portion of the housing 3 comprises a first body portion 3b having a screw thread 8, for example, a male screw thread, on the outer surface thereof and a second body portion 3c, i.e., an attenuated portion, projecting longitudinally from the end portion of the first body portion 3b and having a diameter smaller than that of the first body portion 3b, and a shoulder portion 3d connecting the first body portion 3b and the second body portion 3c.

In this invention, the longitudinal length of the attenuated portion of the housing, the second body portion 3c, projecting from the first body portion, is preferably longer than the width of the shoulder portion 3d to ensure to obtain the improved sealing ability.

Further, the pressure sensor thus constructed can be easily fitted with the other component 50, i.e., the device containing the high pressure medium, for example, various high pressure equipment, oil pressure equipment or the like, by a thread fastening.

Therefore, the device 50 is provided with an aperture through which the housing 3 is installed, having a first portion, a screw thread 50a, for example, a female screw thread, being provided on the inner surface thereof, and a second portion, i.e., an attenuated portion having a diameter smaller than that of the first portion and provided in a position closer to the high pressure medium than the first portion, having a screw thread, and a step like portion 50c connecting the first and the second portions.

Moreover, a concave portion 50b having a diameter smaller than that of the screw portion 50a is provided in the vicinity of the step-like portion 50c, and closer to the pressure medium P than the first portion.

Figure 5A:
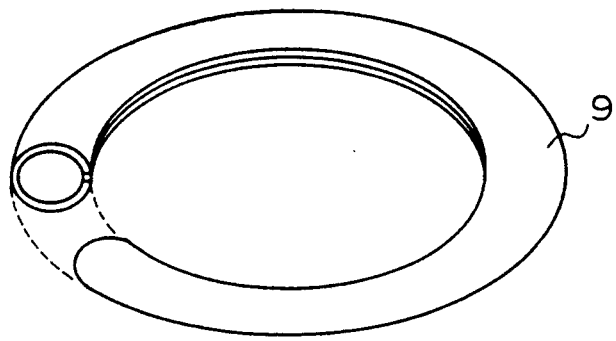
FIGS. 5a and 5b are schematic views of the embodiments of the sealing ring used in this invention.
Figure 5B:
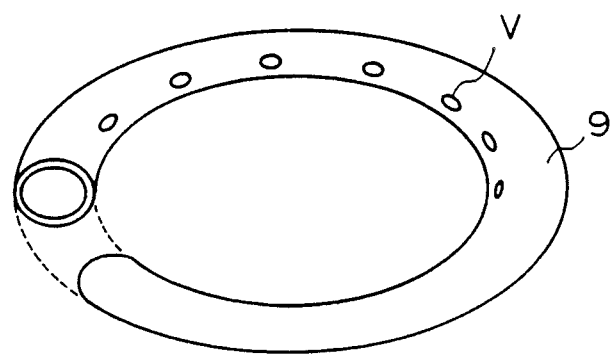

A C-ring 9 made of a metallic substance having an elasticity, a cross sectional view thereof showing the shape of a C as shown in FIG. 5a, is provided in the concave portion 50b and interposed between the first and the second portions, to seal the high pressure medium.

In this third embodiment, since the sealing portion comprising the metallic C-ring 9 has a diameter smaller than that of the male screw thread 8, the pressure received by the whole pressure sensor can be reduced with respect to the prior art, in which the diameter of the sealing portion is larger than that of the portion on which a screw thread is provided, and therefore, the reliability of the mechanical strength of the screw can be increased due to this reduction.

Figure 9:
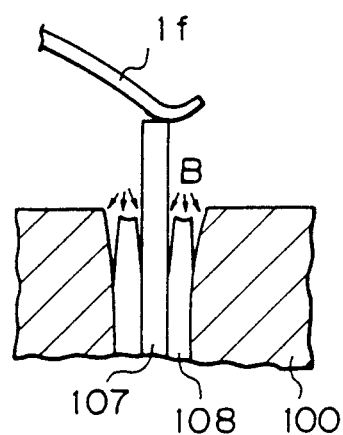
FIG. 9 is a cross sectional view illustrating a cause of leakage of the sealing liquid from the hermetically sealed portion in the prior art.
Figure 8:
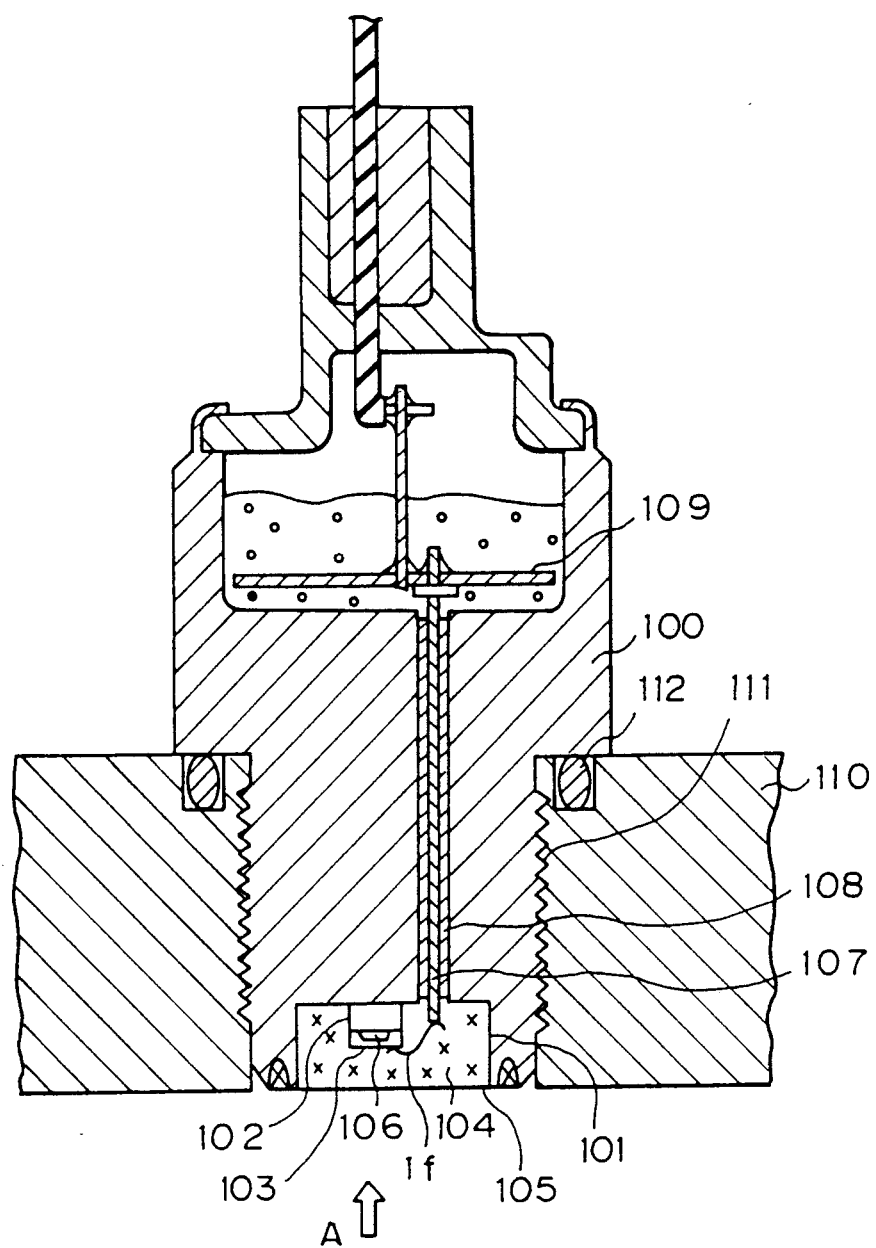

On the other hand, it is known that when the metallic C-ring 9 is provided closer to the high pressure medium with respect to the screw thread 8, to reduce the pressure received by the whole pressure sensor, and a high pressure is applied thereto, the portion of the housing surrounding the insulating sealing material 108 tends to expand outward because the high pressure silicon oil 1e is applied to the one end of the lead wire 107 and the other end thereof is extended into a inner space 2 in which no pressure is applied, and therefore, in a worse case, the silicon oil will leak out through the contacting surfaces of the housing and the sealing material or between the sealing material and the lead wire as indicated by arrow B in FIG. 9, so that the characteristics of the pressure sensor will be deteriorated.

In this embodiment, however, the portion of the lead wire 7 penetrating the second portion of the housing 3, i.e., an attenuated portion having a small diameter, will receive a compressive force from the external surface of the housing in the direction, as shown by arrows Q in FIG. 3, generated by the high pressure medium between the second portion 3c of the housing and the device 50 on which the housing 3 of the pressure sensor is installed, and serve to press the part of the second portion 3c in the vicinity of the lead wire 7 in the direction of the lead wire 7, to thereby increase sealing characteristic since no separation of the sealing material 6 from the lead wire 7 or a portion of the housing occurs.

The fourth embodiment of the present invention will be described with reference to FIG. 6.

Figure 6:
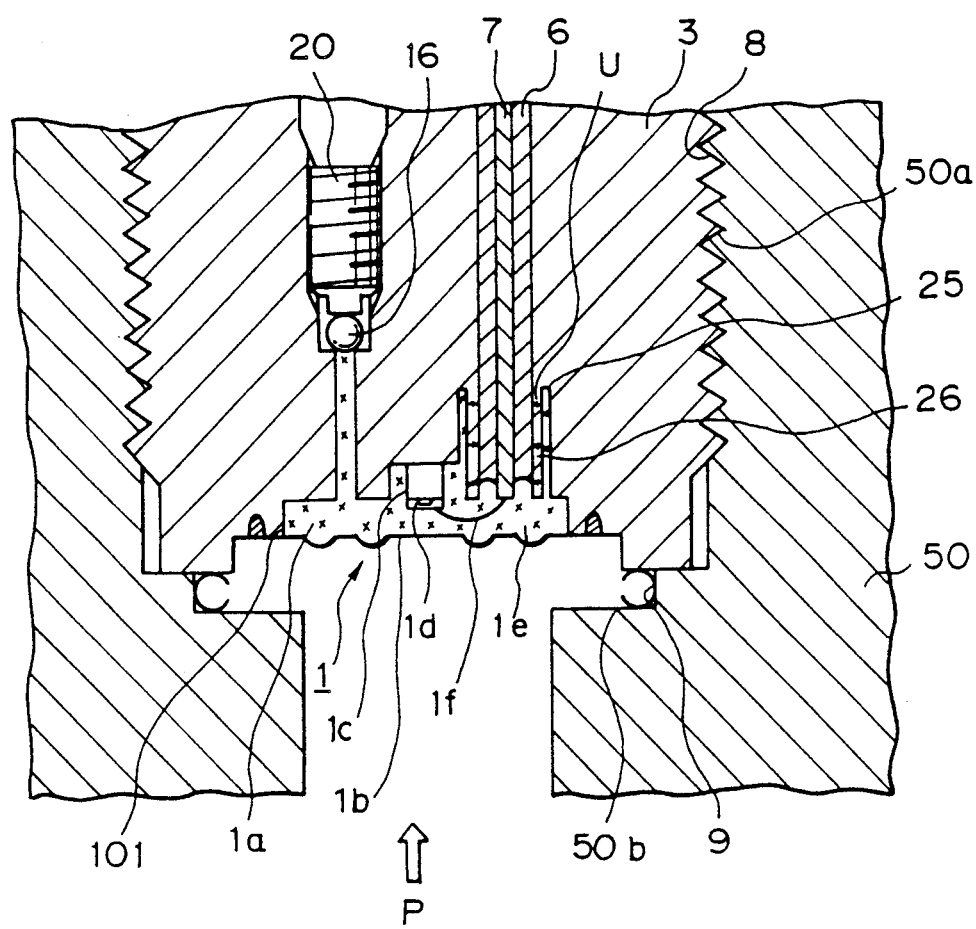
FIG. 6 is a partial cross sectional view of a fourth embodiment of the pressure sensor of the present invention.
Figure 7:
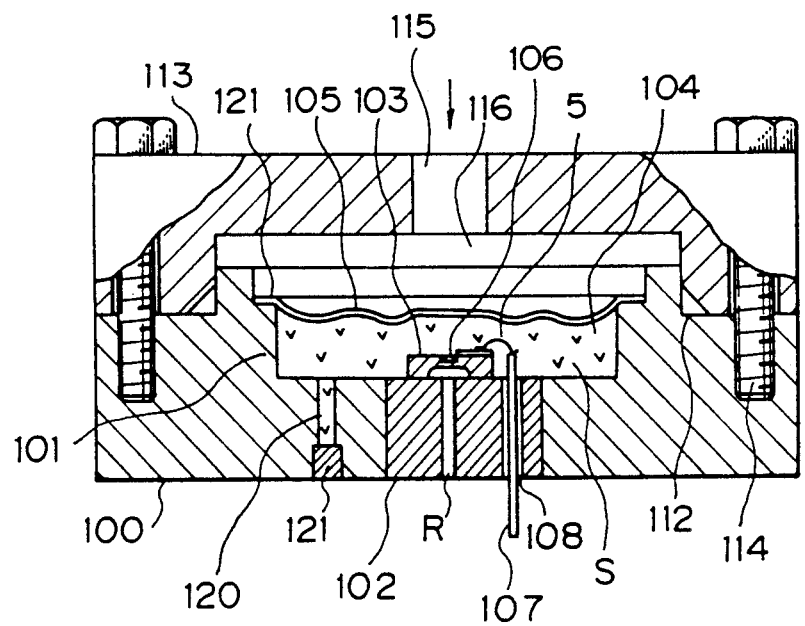
FIGS. 7 and 8 are cross sectional views of prior art pressure sensors.

In FIG. 6, an enlarged partial view in which a housing 3 is installed in a device 50 in the same manner as shown in FIG. 3 is illustrated, and the same components as shown in FIG. 3 are given the same reference number.

In this embodiment, the housing 3 does not have an attenuated portion projected from the first portion having a screw thread on the surface thereof, although the configuration of the aperture of the device 50 is the same as that shown in FIG. 3, and further, has a sealing portion comprising a metallic C-ring 9 provided between the top end portion of the housing 3 and the concave portion 50b of the aperture of the device 50.

Accordingly, in this embodiment, the high pressure medium does not press a part of the portion of the housing 3 onto the lead wire 7, as in FIG. 3, but rather the housing 3 is provided with a grooved portion 25 having a circular configuration, one end thereof being communicated with the cavity 101, to encircle the lead wire 7 in the cavity 101, and the grooved portion 25 is filled with the silicon oil 1e.

Therefore, when the silicon oil is under pressure, this pressure will also affect the silicon oil inside the grooved portion 25, and the silicon oil in the grooved portion thus affected will press a portion 26 between the silicon oil 1e and the insulating sealing material 6 in the direction to the lead wire 7, as shown by arrow U, to increase the sealing ability of the hermetic sealing terminal.

In this embodiment, the same effect of reducing the diameter of the sealing portion to less than the diameter of screw portion as in the third embodiment, can be obtained.

Although four different embodiments have been described above, it is obvious that this invention can not be restricted only to the four embodiments described, and that many variations of this invention can be conceived as long as they do not fall outside the scope of this invention; for example, as follows:

(1) When it is desired to detect the pressure of a pressure medium having a high pressure of more than 500 kg/cm$^2$, an O-ring made of rubber should not be used as the sealing material, and desirably, an O-ring or C-ring made of metal is used as the sealing material.

In such a case, an O-ring or C-ring made of stainless steel with copper plating, an inconel and a hastelloy or the like may be used.

(2) In the embodiments mentioned above, the silicon oil 1e is sealed after it is injected into the cavity by sealing with the steel ball valve 16 and the plug 20, but another sealing method in which silicon oil is sealed by utilizing a plastic deformation of a portion on which the metallic diaphragm is fixedly adhered, as shown in Japanese Unexamined Patent Publication 61-22222, may be used.

(3) As the insulated sealing liquid, a liquid made of fluorosilicon or the like may be used instead of the silicon oil.

According to the present invention, as described above, the superior effects described hereunder can be obtained:

(1) Leakage of the sealing liquid from the pressure sensor does not occur because the sealing element for sealing the sealing liquid in the cavity is provided between the sealing liquid and the pressure medium, and thus a semiconductor pressure sensor having a high reliability can be obtained.

(2) The pressure received by the whole pressure sensor can be reduced, and thus the reliability of the screw thread by which the housing is installed in the device containing the pressure medium can be increased.

(3) A semiconductor pressure sensor having an hermetic terminal and used for detecting a pressure medium having a high pressure can be realized because the sealing ability of the hermetic portion thereof is increased.

We claim:

1. A pressure sensor which comprises:

a housing having a cavity at at least one end portion thereof, a pressure detecting element provided within said cavity for generating an electric signal corresponding to a pressure detected, transmitting means for transmitting said signal to an outside of said housing and having a hermetically sealed portion in said housing, one end thereof being connected to a portion of said cavity of said pressure detecting element, a sealed medium provided within said cavity to prevent deterioration of said pressure detecting element, a diaphragm provided to cover said cavity, a sealing element for sealing said sealed medium within said cavity and provided in a portion connected to said cavity of said housing, and means by which a sealing ability of a portion having a possibility of leakage of said sealed medium connected to said cavity, is improved by utilizing a back pressure of a pressure medium, wherein said means for improving the sealing ability of said portion is said hermetically sealed portion being constructed in such a manner that said pressure sensor is mounted on a device containing the pressure medium by inserting at least one end of said housing portion into an aperture provided in said device by fitting a screw thread provided on the outer surface of said housing into a screw thread provided on an inner surface of said aperture of the device, and further, said aperture is provided with an attenuated portion having a diameter smaller than that of the portion on which said screw thread is formed, so as to form a step-like portion therebetween.

2. A pressure sensor according to claim 1, wherein both said diaphragm and said sealing element are provided on the surface of the attenuated portion of said housing.

3. A pressure sensor according to claim 1, wherein said pressure detecting element sensor is capable of detecting a pressure of 50 atm to 2000 atm.

4. A pressure sensor which comprises:

a housing having a cavity at at least one end portion thereof, a pressure detecting element provided within said cavity for generating an electric signal corresponding to a pressure detected, transmitting means for transmitting said signal to an outside of said housing and having a hermetically sealed portion in said housing, one end thereof being connected to a portion of said cavity of said pressure detecting element, a sealed medium provided within said cavity to prevent deterioration of said pressure detecting element, a diaphragm provided to cover said cavity, a sealing element for sealing said sealed medium within said cavity and provided in a portion connected to said cavity of said housing, and means by which a sealing ability of a portion having a possibility of leakage of said sealed medium connected to said cavity, is improved by utilizing a back pressure of a pressure medium, wherein said means for improving the sealing ability of said portion is said hermetically sealed portion being constructed in such a manner that a diameter of the end portion of said housing at which said cavity is provided is smaller than that of the remaining housing, and wherein said pressure sensor having said transmitting means being provided to penetrate said housing while being hermetically sealed and one end thereof being projected into said cavity to come into electric contact with said detecting element, and the end thereof being led out to a portion not containing the pressure medium, is mounted on a device containing the pressure medium by inserting at least one end of said housing portion thereof into an aperture provided in said device by fitting a screw thread provided on the outer surface of said housing having a large diameter into a screw thread provided on an inner surface of said aperture of the device, and further, said aperture is provided with an attenuated portion having a diameter smaller than that of the portion on which said screw thread is formed, said attenuated portion being formed at a position corresponding to the end portion of said housing having a relatively smaller diameter and located closer to said pressure medium than the portion having said screw thread, so as to form a step-like portion therebetween.

5. A pressure sensor according to claim 4, wherein said housing is provided with an attenuted portion at one end thereof having a diameter smaller than that of the other portion and said cavity being provided on the top surface of said attenuated portion and further said pressure sensor is mounted on said device containing the pressure medium by inserting said one end of the housing portion having said attenuated portion into said aperture.

6. A pressure sensor according to claim 4, wherein said step-like portion is further provided with a concave portion and a sealing ring is provided between said housing and said concave portion for sealing the pressure medium therein.

7. A pressure sensor according to claim 6, wherein said sealing ring is made of a metal.

8. A pressure sensor which comprises:
 a housing having a cavity at at least one end portion thereof,
 a pressure detecting element provided within said cavity for generating an electric signal corresponding to a pressure detected,
 transmitting means for transmitting said signal to an outside of said housing and having a hermetically sealed portion in said housing, one end thereof being connected to a portion of said cavity of said pressure detecting element,
 a sealed medium provided within said cavity to prevent deterioration of said pressure detecting element,
 a diaphragm provided to cover said cavity,
 a sealing element for sealing said sealed medium within said cavity and provided in a portion connected to said cavity of said housing, and
 means by which a sealing ability of a portion having a possibility of leakage of said sealed medium connected to said cavity, is improved by utilizing a back pressure of a pressure medium,
 wherein said means for improving the sealing ability of said hermetically sealed portion is constructed in such a manner that a grooved portion surrounding said hermetically sealed portion of said transmitting means is provided in the vicinity of the bottom portion of said cavity, so as to connect said grooved portion to said cavity and to be filled with said sealed medium, and
 wherein said sensor is mounted on a device containing the pressure medium by inserting at least one end of said housing portion thereof into an aperture provided in said device by fitting a screw thread provided on the outer surface of said housing into a screw thread provided on an inner surface of said aperture of the device, and further, said aperture is provided with an attenuated portion having a diameter smaller than that of the portion of which said screw thread is formed, and is located closed to said pressure medium than the portion having said screw thread, so as to form a step-like portion therebetween.

9. A pressure sensor according to claim 8, wherein said step-like portion is further provided with a concave portion and a sealing ring is provided between said housing and said concave portion for sealing the pressure medium therein.

10. A pressure sensor for sensing a pressure of a pressurized medium in a device, comprising:
 a housing having a cavity at a first end portion thereof;
 a pressure detecting element provided within said cavity, said pressure detecting element generating an electric signal corresponding to said pressure of said medium;
 transmitting means for transmitting said signal to an outside of said housing, said transmitting means being hermetically sealed within said housing and having a first end connected to a portion of said cavity having said pressure detecting element;
 a sealed medium provided within said cavity for preventing deterioration of said pressure detecting element;
 a diaphragm provided to cover said cavity; and
 means for sealing said sealed medium within said cavity for reducing possible leakage of said sealed medium within said cavity by utilizing a back pressure of said pressurized medium, said sealing means including a sealing element provided in a portion connected to said cavity of said housing, said sealing element having at least one end surface forming a part of a surface of said housing in a vicinity of a surface portion of said diaphragm such that:
  said end surface of said sealing element and said surface portion of said diaphragm form a continuous common surface of said housing, and
  said end surface of said sealing element faces an inner surface of an aperture of said device containing said pressurized medium, said housing of said pressure sensor being insertable through said aperture of said device;
 said pressure sensor being mounted on said device containing the pressurized medium so that said continuous common surface of said housing and said inner surface of said aperture of said device are provided in said pressurized medium.

11. A pressure sensor according to claim 10, wherein said transmitting means penetrates said housing while being hermetically sealed, said first end of said transmitting means projecting into said cavity to come into electric contact with said pressure detecting element, said transmitting means having a second end led out to a portion not containing said pressurized medium.

12. A pressure sensor according to claim 10, further comprising:
 a second cavity at a second end portion of said housing;
 a second sealed medium located within said second cavity;
 a cover for covering said second cavity and said second sealed medium; and a lead wire extending from said second cavity to said outside of said housing, said lead wire being connected to a second end of said transmitting means.

13. A pressure sensor according to claim 10, wherein:
said housing has an outer surface including a first screw thread corresponding to a second screw thread of said aperture of said device, said first and second screw threads having a first diameter;
said housing has an attenuated portion corresponding to an attenuated portion of said aperture of said device, said attenuated portion of said aperture having a second diameter smaller than said first diameter, said attenuated portion of said aperture being disposed between said second screw thread and said pressurized medium, thereby forming a step-like portion therebetween in said aperture;
said pressure sensor further comprises a sealing ring for sealing said pressurized medium between said housing portion and said device, said sealing ring being disposed between said attenuated portion of said housing and said step-like portion in said aperture.

14. A pressure sensor according to claim 13, wherein said sealing ring is made of metal and has a cross sectional configuration of a C-shape.

15. A pressure sensor according to claim 13, wherein said sealing ring is made of metal and has a circular cross sectional configuration, there being a plurality of apertures on a surface of the sealing ring.

16. A pressure sensor according to claim 13, wherein said diaphragm and said sealing element are provided on surface of the attenuated portion of the housing.

17. A pressure sensor according to claim 13, wherein said pressure detecting element sensor detects a pressure from a range of about 50 atm to about 2000 atm.

18. A pressure sensor for sensing a pressure of a pressurized medium in a device, comprising:
a housing having a cavity at an end portion thereof, said end portion being insertable into an aperture of said device, said housing comprising:
an outer surface including a first screw thread corresponding to a second screw thread of said aperture of said device, said first and second screw threads having a first diameter,
an attenuated portion corresponding to an attenuated portion of said aperture of said device, said attenuated portion of said aperture having a second diameter smaller than said first diameter, said attenuated portion of said aperture being disposed between said second screw thread and said pressurized medium, thereby forming a step-like portion therebetween in said aperture;
a pressure detecting element provided within said cavity for generating an electric signal corresponding to said pressure of said medium;
transmitting means for transmitting said signal to an outside of said housing, said transmitting means being hermetically sealed within said housing and having a first end connected to a portion of said cavity having said pressure detecting element;
a sealed medium provided within said cavity for preventing deterioration of said pressure detecting element;
a diaphragm provided to cover said cavity; and
means for sealing said sealed medium within said cavity for reducing possible leakage of said sealed medium within said cavity by utilizing a back pressure of said pressurized medium, said sealing means including a sealing element provided in a portion connected to said cavity of said housing.

19. A pressure sensor according to claim 18, further comprising a sealing ring for sealing said pressurized medium between said housing portion and said device, said sealing ring being disposed between said attenuated portion of said housing and said step-like portion in said aperture.

20. A pressure sensor for sensing a pressure of a pressurized medium in a device, comprising:
a housing having a cavity at an end portion thereof, said end portion being insertable into an aperture of said device, said housing comprising:
an outer surface including a first screw thread corresponding to a second screw thread of said aperture of said device, said first and second screw threads having a first diameter, and
an attenuated portion corresponding to an attenuated portion of said aperture of said device, said attenuated portion of said aperture having a second diameter smaller than said first diameter, said attenuated portion of said aperture being disposed between said second screw thread and said pressurized medium, thereby forming a step-like portion therebetween in said aperture;
a pressure detecting element provided within said cavity for generating an electric signal corresponding to said pressure of said medium;
transmitting means for transmitting said signal to an outside of said housing, said transmitting means being hermetically sealed within said housing and having a first end connected to a portion of said cavity having said pressure detecting element, said transmitting means penetrating said housing while being hermetically sealed, said first end of said transmitting means projecting into said cavity to come into electric contact with said pressure detecting element, said transmitting means having a second end led out to a portion not containing said pressurized medium;
a sealed medium provided within said cavity for preventing deterioration of said pressure detecting element;
a diaphragm provided to cover said cavity; and
means for sealing said sealed medium within said cavity for reducing possible leakage of said sealed medium within said cavity by utilizing a back pressure of said pressurized medium, said sealing means including a sealing element provided in a portion connected to said cavity of said housing.

21. A pressure sensor according to claim 20, wherein:
said step-like portion includes a concave portion; and
said pressure sensor further comprises a sealing ring for sealing said pressurized medium between said housing portion and said device, said sealing ring being disposed between said housing and said concave portion.

22. A pressure sensor for sensing a pressure of a pressurized medium in a device, comprising:
a housing having a cavity at an end portion thereof,
a pressure detecting element provided within said cavity for generating an electric signal corresponding to said pressure of said medium;
transmitting means for transmitting said signal to an outside of said housing, said transmitting means being hermetically sealed within said housing and having a first end connected to a portion of said cavity having said pressure detecting element;

a sealed medium provided within said cavity for preventing deterioration of said pressure detecting element;

a diaphragm provided to cover said cavity; and means for sealing said sealed medium within said cavity for reducing possible leakage of said sealed medium within said cavity by utilizing a back pressure of said pressurized medium, said sealing means including:
- a sealing element provided in a portion connected to said cavity of said housing, and
- a grooved portion surrounding a hermetically sealed portion of said transmitting means at a bottom portion of said cavity of said housing, said grooved portion being connected to said cavity and containing said sealed medium.

23. A pressure sensor according to claim 22, wherein:
said housing has an outer surface including a first screw thread corresponding to a second screw thread of said aperture of said device, said first and second screw threads having a first diameter;

said housing has an attenuated portion corresponding to an attenuated portion of said aperture of said device, said attenuated portion of said aperture having a second diameter smaller than said first diameter, said attenuated portion of said aperture being disposed between said second screw thread and said pressurized medium, thereby forming a step-like portion therebetween in said aperture.

24. A pressure sensor according to claim 23, wherein:
said step-like portion includes a concave portion; and
said pressure sensor further comprises a sealing ring for sealing said pressurized medium between said housing portion and said device, said sealing ring being disposed between said housing and said concave portion.

* * * * *